United States Patent
Roberts et al.

(10) Patent No.: US 9,722,772 B2
(45) Date of Patent: Aug. 1, 2017

(54) DISTRIBUTION OF DYNAMIC ACCURACY INFORMATION IN A NETWORK OF IEEE 1588 CLOCKS

(71) Applicant: ALCATEL-LUCENT CANADA INC., Ottawa (CA)

(72) Inventors: Peter Roberts, Ottawa (CA); Ian Leighton, Ottawa (CA); Kin-Yee Wong, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 29 days.

(21) Appl. No.: 14/499,686

(22) Filed: Sep. 29, 2014

(65) Prior Publication Data

US 2016/0094335 A1 Mar. 31, 2016

(51) Int. Cl.
*H04L 7/00* (2006.01)
*H04L 7/04* (2006.01)
*H04J 3/06* (2006.01)

(52) U.S. Cl.
CPC .............. *H04L 7/04* (2013.01); *H04J 3/0641* (2013.01); *H04J 3/0667* (2013.01); *H04L 7/0008* (2013.01)

(58) Field of Classification Search
CPC ................................. H04L 7/04; H04L 7/0008
USPC ........ 375/356, 355, 357, 371, 376; 370/355, 370/503, 336, 254
See application file for complete search history.

(56) References Cited

U.S. PATENT DOCUMENTS

| | | | |
|---|---|---|---|
| 2011/0200051 A1 | 8/2011 | Rivaud et al. | |
| 2013/0039220 A1* | 2/2013 | Ruffini et al. | 370/255 |
| 2014/0185632 A1* | 7/2014 | Steiner et al. | 370/503 |
| 2015/0071309 A1* | 3/2015 | Aweya et al. | 370/503 |

FOREIGN PATENT DOCUMENTS

| | | |
|---|---|---|
| EP | 2377256 A1 | 10/2011 |
| EP | 2779489 A1 | 9/2014 |
| WO | 2013189536 A1 | 12/2013 |

* cited by examiner

*Primary Examiner* — Dhaval Patel

(57) ABSTRACT

An intermediate clock, either a boundary or a transparent clock, may have to adjust its local clock to match that of a grandmaster clock. If such adjustment is frequent or large, then the intermediate clock may not have much confidence in the reliability of the timing information it passes to a downstream clock in an IEEE 1588 Announce message even if the quality of its local clock is high. The intermediate clock determines a measure of the reliability of its timing information. The intermediate clock inserts an indication of the reliability of the timing information in a transmitted IEEE 1588 Announce message. The intermediate clock may consider an indication of reliability found in an Announce message it receives when inserting an indication of the reliability of timing information into an Announce message which it transmits.

20 Claims, 4 Drawing Sheets

DISTRIBUTION OF DYNAMIC ACCURACY INFORMATION IN A NETWORK OF IEEE 1588 CLOCKS

FIELD OF INVENTION

This invention relates to timing signals within nodes of a telecommunication network, and more particularly to distribution of clock accuracy information within a network.

BACKGROUND

In a telecommunications network employing the IEEE 1588 standard, a common time is distributed throughout the network so that network elements within the network are synchronized. According to IEEE 1588-2002, the first implementation of IEEE 1588, a grandmaster clock on a network element transmits timing information to a boundary clock on another network element using PTP (Precision Time Protocol) messages, typically conveying such information to the boundary clock on the order of several times a second. When the boundary clock receives timing information the boundary clock corrects its own local clock with an offset derived from the time stamps in the various PTP messages used to convey the timing information. The boundary clock then transmits its own timing information to other network elements, including possibly other boundary clocks. A clock that only receives timing information and does not convey it onward using IEEE 1588 is a slave clock. The clock delivering timing information to a second clock is referred to as the parent clock of the second clock. On any of these clocks, a port that receives timing information from another clock is referred to as a slave port, and a port that transmits timing information to another clock is referred to as a master port.

A boundary or slave clock may receive supervisory information from more than one clock. In such a case the boundary or slave clock selects one of these clocks as its parent clock by using a "best master clock" algorithm. The boundary clock or slave clock then uses the timing information received from the parent clock to adjust its local clock.

In IEEE 1588-2008, version 2 of IEEE 1588, transparent clocks are introduced. A transparent clock processes PTP messages that transit the transparent clock as they flow from a master port toward a slave port. The transparent clock does not terminate the PTP messages but augments each. PTP message with the time the PTP message requires to traverse the network element containing the transparent clock.

As part of the PTP communications grandmaster and boundary clocks distribute supervisory information using Announce messages. These Announce messages indicate the quality of the grandmaster clock which is the source of timing into the network as well as the distance of the clock from the grandmaster. For example, a boundary clock whose parent clock is the grandmaster would send Announce messages indicating the quality of the grandmaster clock and a distance of one. The grandmaster clock quality information includes an estimate by the grandmaster clock of its own accuracy and stability. Both of these are indicators of how good the clock is, and may be static or dynamic measures, A transparent clock passes Announce messages unmodified. If a boundary clock or transparent clock receives Announce messages from more than one clock, the clock can use the information in the Announce messages in its implementation of the Best Master Clock Algorithm in order to select which of these clocks to use as its parent clock.

In both cases, the boundary clock or the transparent clock (referred to herein collectively as an "intermediate clock") may initially introduce errors into the timing information. A boundary clock that has recently booted up takes a measurable amount of time to synchronize its own clock with that of its parent clock. The PTP messages transmitted by the boundary clock may therefore not accurately reflect the time signals emanating from the grandmaster clock. Similarly, for a transparent clock its measurement of the transit time of packets through the network element containing the transparent clock may not have stabilized if the network element has recently booted up and the local clock of the transparent clock has not yet synchronized with the grandmaster clock.

In either case, the timing information gleaned by an end application may not match the timing information generated by the grandmaster clock. The Announce messages reaching an end application indicate the accuracy and stability of the grandmaster clock. The Announce messages are silent however regarding the potential decrease in accuracy arising from the presence of boundary clocks and transparent clocks between the grandmaster clock and the slave clocks.

SUMMARY

According to one aspect, a method of communicating timing information in a telecommunication network which uses IEEE 1588 messages to convey timing information is provided. At an intermediate clock, reliability of timing information of a local clock is determined. An indication of grandmaster clock reliability is determined at the intermediate clock from a received Announce message. An indication of reliability in an outgoing Announce message is set at the intermediate clock to be a combination of the determined reliability of the local clock and the indication of grandmaster clock reliability. The outgoing Announce message is transmitted by the intermediate clock.

According to another aspect, a network element in a telecommunication network which uses IEEE 1588 messages to convey timing information is provided. The network element includes a local dock, a processor, and memory. The memory includes instructions which, when executed by the processor, cause the processor to determine reliability of timing information of the local clock. The memory also includes instructions which cause the processor to determine an indication of grandmaster clock reliability from a received Announce message, to set an indication of reliability in an outgoing Announce message to be a combination of the determined reliability of the local clock and the indication of grandmaster clock reliability, and to transmit the outgoing Announce message.

The methods of embodiments of the invention may be stored as logical instructions on a non-transitory computer-readable storage medium in a form executable by a computer processor.

Embodiments of the invention allow boundary clocks and transparent clocks to notify downstream clocks of the reliability of the timing information which the downstream clocks are receiving.

BRIEF DESCRIPTION OF THE DRAWINGS

The features and advantages of embodiments of the invention will become more apparent from the following detailed description of the preferred embodiment(s) with reference to the attached figures, wherein.

DETAILED DESCRIPTION OF THE PREFERRED EMBODIMENTS

Figure 1:
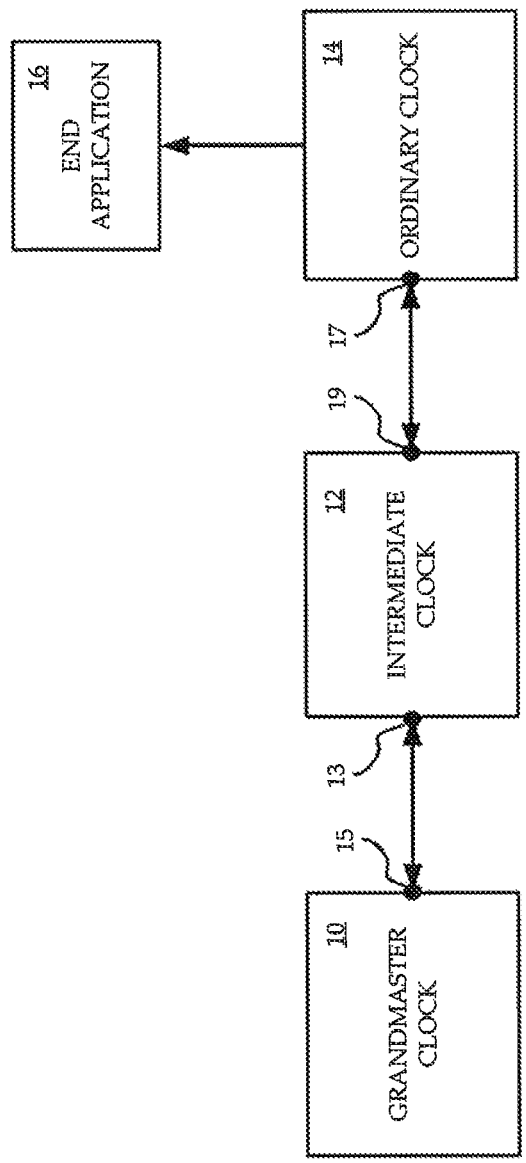
FIG. 1 is a block diagram of a portion of an example telecommunication network.

Referring to FIG. 1, a block diagram of a portion of a telecommunication network is shown. A first ordinary clock acts as a grandmaster aster clock 10. The network element on which the grandmaster clock 10 is located is confident of its clock because the network element is receiving reliable time information to which it can match its clock, such as by using a GPS receiver. The grandmaster clock 10 exchanges Precision Time Protocol (PTP) messages with an intermediate clock 12 located, on a separate network element. The intermediate clock 12 may be a boundary clock or a transparent clock. The intermediate clock 12 exchanges PTP messages with a second ordinary clock 14 located on yet another network element. An end application 16 uses the second ordinary clock 14 as a source of timing information.

The intermediate clock 12 has selected the grandmaster clock 10 as its parent clock, and has a slave port 13 linked to a master port 15 on the grandmaster clock 10. The second ordinary clock 14 has a slave port 17 linked to a master port 19 on the intermediate clock 12.

The grandmaster clock 10 sends Announce messages to the intermediate clock 12 indicating the accuracy and stability of the time within the grandmaster clock 10. If the intermediate clock 12 is a boundary clock, the boundary clock 12 stores this accuracy and stability information, referred to herein collectively as quality information, internally. The boundary clock 12 increments the distance from the grandmaster by one. The boundary clock 12 then copies the stored grandmaster quality information and the distance from grandmaster into a new Announce message. It then adds quality information related to the boundary clock itself to the new Announce message, and then sends the new Announce message to the ordinary clock 14.

In the case that the intermediate clock 12 is a transparent clock, then the transparent clock modifies the Announce message by adding the quality information of the transparent clock itself and forwards the message toward the ordinary clock 14.

The telecommunication network shown in FIG. 1 is chosen deliberately as a very simple network in order to best illustrate embodiments of the invention.

Figure 2:
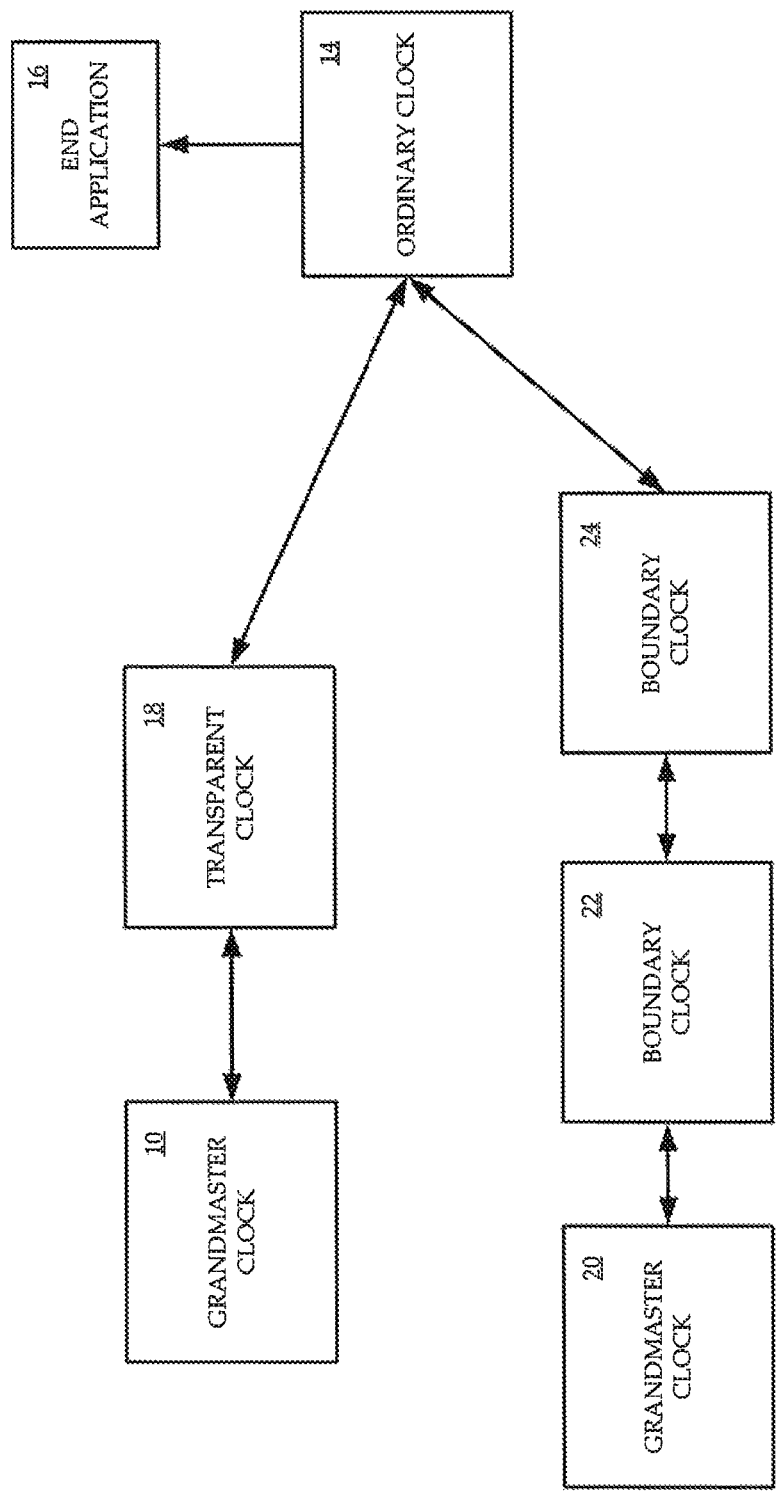
FIG. 2 is a block diagram of a portion of another example telecommunication network.

More generally there may be more than one intermediate clock between the grandmaster clock 10 and the second ordinary clock 14. The second ordinary clock 14 may receive PTP messages from more than one intermediate clock, and may receive timing information about more than one grandmaster clock. For example, a more complicated arrangement of clocks is illustrated in FIG. 2. In the example telecommunication network of FIG. 2, the ordinary clock 14 has two possible grandmaster clocks 10 and 20. A transparent clock 18 lies between the first grandmaster clock 10 and the ordinary clock 14. Two boundary clocks 22 and 24 lie in series between the second grandmaster clock 20 and the ordinary clock 14. Each intermediate clock 18, 20, and 24 adds their quality information to the announce messages forwarded to the next clock.

Broadly, an intermediate clock in a telecommunications network employing IEEE 1588 determines the reliability of its local clock, sets an indication of reliability in an outgoing Announce message to be a combination of the determined reliability of the local clock and of the grandmaster clock reliability indication, and transmits the outgoing Announce message.

Figure 3:
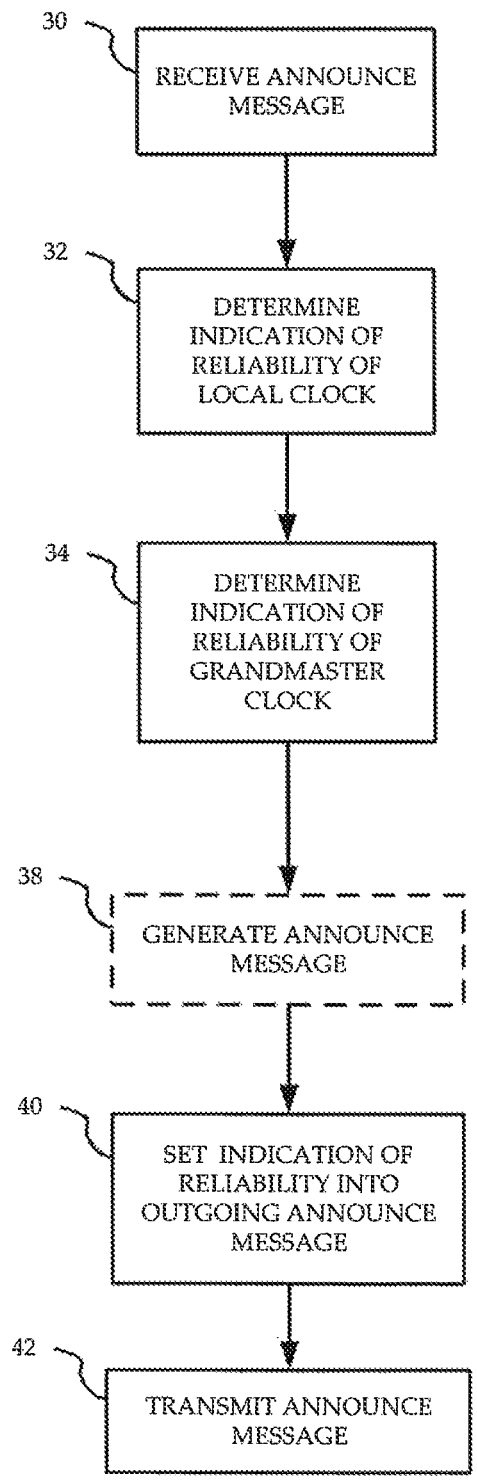
FIG. 3 is a flowchart of a method carried out by an intermediate clock of FIG. 1 according to one embodiment of the invention.

Referring to FIG. 3, a flowchart of a method carried out by the intermediate clock 12 of FIG. 1 according to one embodiment of the invention is shown. At step 30 the intermediate clock receives an Announce message. At step 32 the intermediate clock 12 determines an indication of the reliability of timing information of a local clock of the intermediate clock 12. The reliability of the timing information is directly related to the stability of the synchronization of the frequency of the local clock to the frequency of the grandmaster clock. In the case of the intermediate clock 12 being a boundary clock, the timing information provided by the boundary clock may be unreliable directly due to lack of synchronization between the boundary clock and its master clock resulting in the boundary clock not "knowing" the correct time. In the case of the intermediate clock 12 being a transparent clock, the time taken by the Announce message to transit the transparent clock may be unreliably known due to lack of synchronization between the transparent clock and the grandmaster clock.

Reliability is distinct from quality and stability. Quality is a (generally) static measure of the accuracy and class of a clock. Stability is a (generally) static measure of the clock's own performance against a PTP reference. In contrast, reliability is a quantity that can change over time. The reliability of timing information can change over time as a device gradually stabilizes. This may be because the local clock of an intermediate clock gradually adjusts to match a master clock of which it has recently become aware. Reliability of timing information can be used by a clock in deciding whether to use the master clock to which the Announce message containing the reliability indication pertains, along with the quality and stability of the clock. For example, the quality and stability information may indicate to a clock that the clock to which an Announce message pertains is a very good clock, but the indication of reliability may indicate that the timing information is not yet very reliable. As time progresses, subsequent Announce messages pertaining to that clock will indicate the same quality and stability, but the reliability of the timing information in the Announce message should improve as the master clock adjusts its local clock to the grandmaster clock.

At step 34 the intermediate clock determines an indication of reliability contained in the received Announce message.

At step 38 the intermediate clock 12 generates an Announce message to transmit to its slave clock. The term "generates" is used loosely and the step is shown in dashed lines in FIG. 3, because in the case that the intermediate clock 12 is a transparent clock then no new Announce message is actually generated. Rather the Announce message received at step 30 passes through the transparent dock and is forwarded as an outgoing Announce message. Either the step 38 of generating an Announce message may be viewed as optionally implemented based on whether the intermediate clock is a boundary clock or a transparent clock, or the term "generating" may be read as transferring the Announce message received at step 30 to the queue of outgoing packets.

At step 40 the intermediate clock 12 sets an indication of the reliability into the outgoing Announce message (either generated at step 38 if the intermediate clock is a boundary clock or forwarded if the intermediate clock is a transparent clock) to be a combination of the indication of reliability determined at step 32 and the indication of grandmaster reliability determined at step 34. The indication of the reliability that is set in the outgoing Announce message is as a TLV (type-length-value) element, the value of the TLV element indicating a degree of reliability of the timing information in the Announce message. This can be done in any way which reflects the cumulative reliability of the intermediate clock and all upstream clocks. For example, if the indications were simply an actual measure of reliability, e.g. the clock is reliable to within 10, 50, 100, or 200 µs, then the adjusted value of the indication of reliability could simply be determined by adding the received value and the value determined at step 32. This may be the simplest method of adjusting the value but also considers only the worst case scenario of the cumulative reliability, i.e. that every error is in the same direction. In another embodiment, the values are added as root-mean-squares, which may be advantageous if the values change rapidly. At step 42 the intermediate clock 12 transmits the outgoing Announce message through its slave port, which in the network illustrated in FIG. 1 leads to the second. ordinary clock 14.

In the embodiment described above the intermediate clock sets a TLV element in the outgoing Announce message, the value of the TLV element indicating the degree of reliability of the timing information in the Announce message. Alternatively, the intermediate clock 12 sets the value of a single bit in the outgoing Announce message, the value of the bit indicating whether the timing information of the Announce message is reliable. In such an embodiment, at step 32 the intermediate clock makes a Boolean determination regarding the reliability of its own timing information. For example, if the difference between the frequency of the local clock of the intermediate clock and the frequency of the clock of the grandmaster clock exceeds a threshold (such as 200 parts per billion (or nanoseconds per second)), then the intermediate clock 12 determines that its timing information is not reliable and that the Boolean value if FALSE. If the difference between the frequency of the local clock and the grandmaster clock does not exceed the threshold, then the intermediate clock 12 determines that its timing information is reliable and that the Boolean value is TRUE. The intermediate clock sets the indication of reliability in the outgoing Announce message by performing an AND operation between the determined indication of reliability and the received indication of reliability. The effect of this is that the indication of reliability of timing information ultimately received by the ordinary clock 14 is only TRUE if all upstream clocks are confident in the reliability of their timing information.

In the embodiment described above, when the intermediate clock determines the value of the indication of reliability to insert into the transmitted Announce message, the intermediate clock takes into account the indication of reliability that is included in a received Announce message. Alternatively, the intermediate clock only includes an indication of its own contribution to the reliability of the timing information. In such an embodiment, the step 34 described above with reference to FIG. 3 is excluded. Such an embodiment may provide less accurate reliability information to an ordinary clock, but may also be simpler to implement. The degree of inaccuracy may even be lessened, because the errors introduced by each intermediate clock between. the grandmaster clock and the ordinary clock may tend to cancel each other. For example, some boundary clocks may initially be slower than the grandmaster clock and some may initially be faster than the grandmaster clock.

The methods described above executed by the intermediate clock are preferably implemented as logical instructions in the form of software. Alternatively, the methods may be implemented as hardware, or as a combination of software or hardware. If in the form of software, the logic of the methods may be stored on a non--transitory computer-readable storage medium in a form. executable by a computer processor. If in the form of hardware, the logic of the methods may be implemented by a general purpose processor, a network processor, a digital signal processor, an ASIC, a macroscopic circuit, or multiple such devices.

Figure 4:
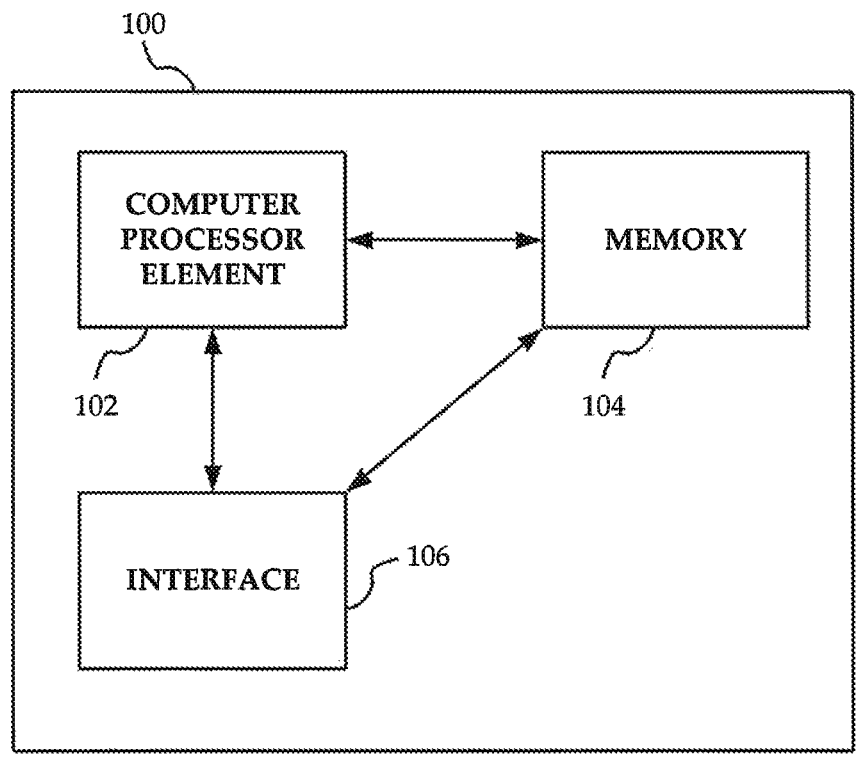
FIG. 4 is a block diagram of a computing environment according to one embodiment of the invention It is noted that in the attached figures, like features bear similar labels.

A simplified block diagram of one embodiment of the intermediate clock is shown in FIG. 4 as a processor assembly 100. The processor assembly 100 includes a computer processor element 102 (e.g. a central processing unit and/or other suitable processor(s)). The computer processor element 102 has access to a memory 104 (e.g. random access memory, read only memory, and the like). The processor element 102 and the memory 104 are also in communication with an interface comprising various I/O devices 106 (e.g. a user input device (such as a keyboard, a keypad, a mouse, and the like), a user output device (such as a display, a speaker, and the like), an input port, an output port, a receiver, a transmitter, and a storage device (such as a tape drive, a floppy drive, a hard disk, a compact disk drive, and the like)). In one embodiment, the methods described above are implemented as software instructions loaded into the memory 104 and causing the computer processor element 102 to execute the methods.

The embodiments presented are exemplary only and persons skilled in the art would appreciate that variations to the embodiments described, above may be made without departing from the spirit of the invention. The scope of the invention is solely defined by the appended claims.

We claim:

1. A method of communicating timing information in a communication network which uses messages to convey the timing information, the method comprising, at a network device having a local clock:
    determining reliability of timing information of the local clock;
    determining an indication of clock reliability from a received announce message;
    setting an indication of reliability in an outgoing announce message based on the determined reliability of the timing information of the local clock and the determined indication of the clock reliability in the received announce message; and
    transmitting the outgoing announce message.

2. The method of claim 1, wherein the network device is a boundary clock, and the method further comprises:
    generating the outgoing announce message.

3. The method of claim 2, wherein determining the reliability of the timing information of the local clock further comprises:
    determining by how much the local clock is to be adjusted so as to match a source clock.

4. The method of claim 1, wherein the network device is a transparent clock, and the received announce message is forwarded as the outgoing announce message after setting the indication of the reliability in the outgoing announce message.

5. The method of claim 4, wherein determining the reliability of the timing information further comprises:
   determining by how much the local clock is to be adjusted so as to match a source clock.

6. The method of claim 1, wherein setting the indication of the reliability further comprises:
   setting a TLV element in the outgoing announce message.

7. The method of claim 1, wherein setting the indication of the reliability further comprises:
   setting a value of a single bit in the outgoing announce message.

8. A network element in a communication network which uses messages to convey timing information, comprising:
   a local clock;
   a processor; and
   memory comprising instructions which, when executed by the processor, cause the processor to determine reliability of timing information of the local clock, determine an indication of clock reliability from a received announce message, set an indication of reliability in an outgoing announce message based on the determined reliability of the timing information of the local clock and the determined indication of the clock reliability in the received announce message, and transmit the outgoing announce message.

9. The network element of claim 8, wherein the network element is a boundary clock, and the memory further comprises:
   instructions which, when executed by the processor, cause the processor to generate the outgoing announce message.

10. The network element of claim 9, wherein the instructions for determining the reliability of the timing information of the local clock further comprise:
    instructions for determining by how much the local clock is to be adjusted so as to match a source clock.

11. The network element of claim 8, wherein the network element is a transparent clock, and the instructions for transmitting the outgoing announce message further comprise:
    instructions for forwarding the received announce message as the outgoing announce message after setting the indication of the reliability in the outgoing announce message.

12. The network element of claim 11, wherein the instructions for determining the reliability of the timing information of the local clock further comprise:
    instructions for determining by how much the local clock is to be adjusted so as to match a source clock.

13. The network element of claim 8, wherein the instructions for setting the indication of the reliability further comprise:
    instructions for setting a TLV element in the outgoing announce message.

14. The network element of claim 8, wherein the instructions for setting the indication of the reliability further comprise:
    instructions for setting a value of a single bit in the outgoing announce message.

15. A method of communicating timing information in a communication network, the method comprising, at an intermediate clock:
    determining reliability of timing information of a local clock;
    determining an indication of grandmaster clock reliability;
    setting an indication of reliability in an outgoing message to be a combination of the determined reliability of the timing information of the local clock and the determined indication of the grandmaster clock reliability; and
    transmitting the outgoing message.

16. The method of claim 1, wherein the messages used to convey timing information are IEEE 1588 messages, determining the indication of the clock reliability from the received announce message comprises determining the indication of the clock reliability from a received Announce message, setting the indication of reliability in the outgoing announce message comprises setting the indication of reliability in an outgoing Announce message, and transmitting the outgoing announce message comprises transmitting the outgoing Announce message.

17. The method of claim 3, wherein the messages used to convey timing information are IEEE 1588 messages, determining the indication of the clock reliability from the received announce message comprises determining the indication of the clock reliability from a received Announce message, setting the indication of the reliability in the outgoing announce message comprises setting the indication of the reliability in an outgoing Announce message, transmitting the outgoing announce message comprises transmitting the outgoing Announce message, and the source clock is a grandmaster clock.

18. The method of claim 5, wherein the messages used to convey timing information are IEEE 1588 messages, determining the indication of the clock reliability from the received announce message comprises determining the indication of the clock reliability from a received Announce message, setting the indication of the reliability in the outgoing announce message comprises setting the indication of the reliability in an outgoing Announce message, transmitting the outgoing announce message comprises transmitting the outgoing Announce message, and the source clock is a grandmaster clock.

19. The method of claim 8, wherein the messages used to convey timing information are IEEE 1588 messages, the instructions to determine the indication of the clock reliability from the received announce message comprise instructions to determine the indication of the clock reliability from a received Announce message, the instructions to set the indication of the reliability in the outgoing announce message comprise instructions to set the indication of the reliability in an outgoing Announce message, and the instructions to transmit the outgoing announce message comprises instructions to transmit the outgoing Announce message.

20. The method of claim 19, wherein the instructions for determining the reliability of timing information of the local clock comprise:
    instructions for determining by how much the local clock is to be adjusted so as to match the grandmaster clock.

* * * * *